Figure 1:
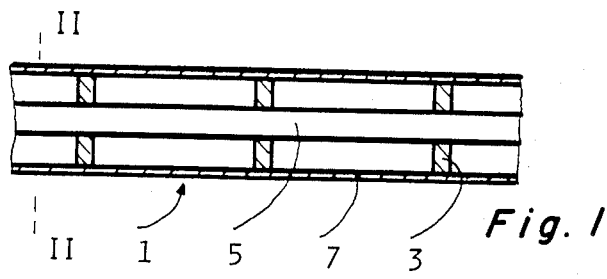

United States Patent [19]

Edvardsen

[11] Patent Number: 4,553,877

[45] Date of Patent: Nov. 19, 1985

[54] METHOD OF CONVERTING A CABLE IN THE GROUND INTO A CLOSED GUIDING TRACK FOR INSERTION OF NEW CONDUCTORS

[76] Inventor: Einar Edvardsen, Idrettsveien, N-1990 Sorum, Norway

[21] Appl. No.: 359,717

[22] PCT Filed: Jul. 13, 1981

[86] PCT No.: PCT/NO81/00032

§ 371 Date: Feb. 26, 1982

§ 102(e) Date: Feb. 26, 1982

[87] PCT Pub. No.: WO82/00388

PCT Pub. Date: Feb. 4, 1982

[30] Foreign Application Priority Data

Jul. 14, 1980 [NO] Norway ................................ 802117

[51] Int. Cl.$^4$ .............................................. H02G 1/12
[52] U.S. Cl. .................................... 405/154; 29/426.5; 156/48; 174/37; 405/303
[58] Field of Search ................. 405/154, 303; 174/37; 29/403.1, 403.2, 403.3, 426.5, 427; 156/48, 50, 94, 155; 427/52

[56] References Cited

U.S. PATENT DOCUMENTS

| | | | |
|---|---|---|---|
| 2,731,738 | 1/1956 | Kossa | 405/154 X |
| 3,132,415 | 5/1964 | Johnson et al. | 29/426.5 |
| 3,290,194 | 12/1966 | Gillemot | 156/48 |
| 3,661,358 | 5/1972 | Dill | 156/48 X |
| 4,018,058 | 4/1977 | Eichenseher et al. | 174/37 X |
| 4,197,628 | 4/1980 | Conti et al. | 29/426.5 |
| 4,281,444 | 8/1981 | Smith | 29/403.1 |
| 4,372,988 | 2/1983 | Bahder | 156/48 X |

OTHER PUBLICATIONS

Optical Fiber Cable Installing Technique in Underground Plant, Japan Telecommunication Review, Jul. 1981, pp. 261–270.

*Primary Examiner*—Dennis L. Taylor
*Attorney, Agent, or Firm*—Ladas & Parry

[57] ABSTRACT

Method of removal of the interior parts of cables in the ground, preferably coaxial (1) and telecommunication (2) cables, for the insertion of new conductors. The insulation material (3,4) may be dissolved or broken down by means of chemical influence of e.g. xylene or copper ethylene diamine for coaxial cable (1) and telecommunication cable (2) respectively, whereby the solution serves as a sliding agent by the withdrawal of the conductor/conductors (5,6). The insulation washers (3) of a coaxial cable (1) may be melted by insertion of a heating element (8) or by means of heat from electrical resistance in the parts (5,7,9) of the cable. The insulation washers (3) in a coaxial cable (1) and the conductors (6) with the insulation material (4) in a telecommunication cable (2) may be milled and removed. By applying electro-magnetic pressurized oscillations the insulation washers (3) of a coaxial cable (1) may be destructed. The insulation material (3) and the conductor (5) of a coaxial cable (1) may be removed by introducing an oscillating pressurized fluid with a simultaneous tension in the center conductor (5).

11 Claims, 9 Drawing Figures

METHOD OF CONVERTING A CABLE IN THE GROUND INTO A CLOSED GUIDING TRACK FOR INSERTION OF NEW CONDUCTORS

The invention relates to a method for converting cables existing in the ground, in buildings, on free line sections between masts etc., into closed guiding tracks for reception of new conductors.

The provision of cables for transmission of telecommunication services is connected with high costs and the need of detailed planning as well as a high amount of labour force by the operation, as considerations have to be made with respect to existing pipelines, cables etc., buildings and traffic conditions.

By the change to transmission of telecommunication services through optical fibres, it will be common to put down in the earth a new system with cables based on this technique. A great deal of older cable types, such as telecommunication cables and coaxial cables, however, thereby will become redundant of use.

So far no method is known for the withdrawal of the internal conductors and insulation materials in such cables. By such a method already existing cables could be used as the cable mantle would serve as a guiding track for the new conductors which could be optical fibres or other conductors. Great savings as to time and also economy will be achieved.

Actual cables in this connection are coaxial cables and telecommuniction cables. Even if the coaxial cables formerly used and put down in the earth have different constructions, different electrical parameters and different reinforcement, the pipes and insulation material of the cables are substantially the same. The very first cables, however, had distance washers made of ebonite, whereas the neweer cables have distance washers made of polyethylene. As an example can be disclosed that a large coaxial cable with an internal diameter of 9.5 mm and a center conductor with a diameter of 2.6 mm, has distance washers with a thickness of 2 mm every 33rd mm. The telecommunication cable or twin set cable has a plurality of pairs with copper conductors usually insulated with paper, possibly with cotton.

For the removal of the conductor or conductors of those cables, the conductor or conductors as well as the insulation material may be transformed to free particles by a suitable method, the particles thereafter being removed by suitable means, or the insulation material of the cable may be dissolved or broken down and thereafter being removed by suitable means, whereafter the conductor/conductors may be withdrawn out of the cable pipe.

The method according to the invention therefore comprises removing the internal insulation material of the cable over a suitable length and withdrawing the conductor/conductors out of one end of the cable.

Removal of the insulating material may be performed by supply of a chemical solvent, e.g. xylene, copper ethylene diamin or an oxidizing agent, e.g. pressurized oxygen, from one end, thereby dissolving or breaking down the material.

In connection with a coaxial cable the chemical solvent may be introduced into the internal part of the cable pipe through a thin hose, the dissolved material thereby being transported back along the hose and out of the pipe. The center conductor hereby may be withdrawn as there will be a sufficiently large clearance between the center conductor and the coaxial cable pipe.

By another embodiment of the method according to the invention, heat is used to melt the insulation material in coaxial cables, the insulation material thereby being transformed to a coating substantially continuosly provided on the internal wall of the cable pipe. The heat for melting the insulation material may be supplied by means of a suitable heat element guided on the center conductor of the coaxial cable, the element being supplied with electrical energy by the center conductor, the outer conductor of the cable and/or a pushing hose provided around the core, which hose forces the element through the length of the cable pipe. Heat may also be supplied by applying electrical potential to the center conductor and/or the outer conductor, the insulation material thereby being melted by the heat developed from the electrical resistance.

The method insulation material will, by virtue of the force of gravity, be collected in the lower part of the cable pipe, as a substantially continuous coating. Within the parts of the cable not being in the horizontal position, a flow of melted or viscous insulation material will move to the lower positioned parts of the cable pipe, depending on how much and for how long heat is supplied. To a certain extent this partly will restrict the free passage of the cable pipe, however, allowing for the entrance of new conductors.

By another embodiment of the method according to the invention, the insulation material of a coaxial cable is removed by guiding a cutting mill on the center conductor of the cable against the insulation material, the insulation material thereby being milled into particles, which are thereafter brought back and out of the cable pipe by means of a suitable fluid, preferably air. Correspondingly, a cutting mill is guided into one end of a cotton or paper insulated telecommunication cable, miling the insulation material as well as the conductors into particles, which are then transported back and out of the cable by means of a suitable fluid.

Upon removal of the insulation material, the conductor or the conductors are removed by tension at the one end of the cable.

A further embodiment of the method according to the invention comprises removing the insulation material in a coaxial cable pipe by means of a pressurized fluid with supposed pressure pulses supplied at one end of the cable, the fluid thereby after a while will create a pressure against the insulation material of the coaxial cable, substantially over the whole length of the cable, the insulation material thereby being forced out of the other end of the cable together with its center conductor which is exposed to tension forces.

In the drawing

Figure 2:
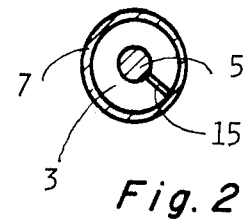
Figure 3:
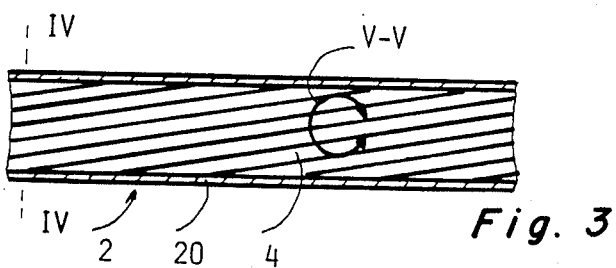
Figure 4:
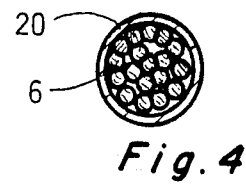
Figure 6:
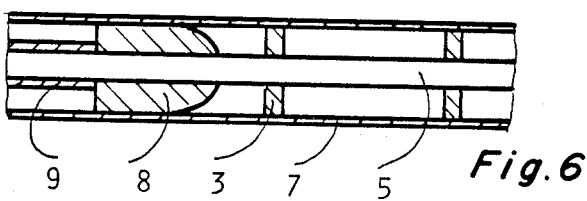
Figure 5:
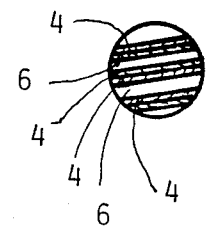
Figure 7:
Figure 8:
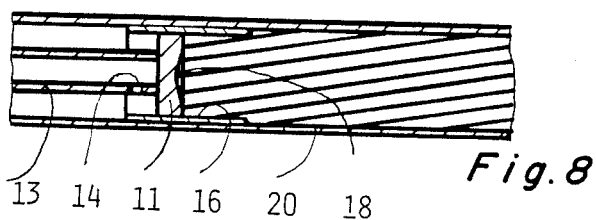
Figure 9:
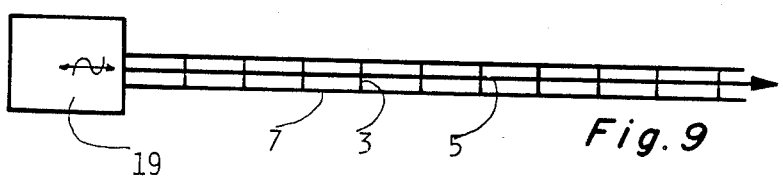

FIG. 1 shows a longitudinal section through a typical coaxial cable,

FIG. 2 a cross-section through a typical coaxial cable,

FIG. 3 a longitudinal section through a typical telecommunication cable,

FIG. 4 a cross-section through a typical telecommunication cable,

FIG. 5 an enlarged detail marked V—V in FIG. 3,

FIG. 6 a longitudinal section of a coaxial cable with a heating element inserted, FIG. 7 a longitudinal section of a coaxial cable with an inserted cutting mill, FIG. 8 a longitudinal section of a telecommunication cable with an inserted cutting mill, and FIG. 9 discloses a principle sketch of a coaxial cable where the insulation washers are exposed to pressure from an oscillating pressure pump and the center conductor is exposed to tension from the other end of the cable.

FIGS. 1 and 2 discloses the principle construction of a coaxial cable 1 with insulation washers 3, center conductor 5 and coaxial cable pipe or outer conductor 7. The insulation washer 3 is designed as an open ring body with a split 15.

FIG. 3 shows a telecommunication cable 2 constructed of several pairs of conductors 6 having surrounding insulation 4 as best is shown enlarged in FIG. 5. The outer mantle 7 of the telecommunication cable surrounds the internal conductors.

Only the principle construction of the telecommunication and coaxial cables are shown in the figures. In addition to the disclosed parts, such cables have different outer cover means.

By introduction of a chemical solvent, for example xylene into a coaxial cable, the insulation washers 3 may be dissolved. The insulation washers 3 usually are manufactured of polyethylene.

The introduction of xylene is performed by means of a hose whose outer diameter is less than the distance between the center conductor and the internal wall of the cable pipe. By the introduction of xylene through the hose, the xylene together with the dissolved insulation material is transported out of the cable pipe. For a quicker reaction the solvent may be heated.

The chemical solvent also may be introduced into one end of the cable in greater quantities to penetrate through the split in the different insulation washers and will thereby simultaneously with the penetration, dissolve parts of the washers and transport these to the other end of the cable as the cable is open in the joints to collect the penetrating xylene. Polyethylene dissolved in xylene is of low viscosity and therefore suitable for this purpose.

Into paper insulated telecommunication cables the solvent, for example copper ethylene diamin, may be supplied pressurized into the one end of the cable. At the other end of the cable a vacuum pump may be provided to accelerate the penetration of the liquid. Copper ethylene diamin dissolves the paper insulation forming a relatively low viscosity liquid. The solvent may be diluted with water as it normally has a higher viscosity than water. The penetration of the liquid hereby is made easier.

After the paper insulation has been dissolved, the conductors of the cable may be withdrawn out of the cable as the solution of copper ethylene diamin and paper will act as a sliding agent.

Melting of the insulation washers in a coaxial cable may be provided by insertion of a heating element, designed with a center aperture for the entrance of the center conductor 5, and being inserted into one end of the cable on the center conductor. The insertion is performed by means of a hose 9 pushing the heating element into the cable. Energizing of the heating element may be performed by the outer conductor 7 of the coaxial cable 1, the center conductor 5 or possibly the hose 9. The heating element is heated before insertion in the cable pipe. Polyethylene is melting to a high viscosity mass at 110°-130° C. and melting of the washers may be performed by supply of a sufficient amount of energy to the heating element and simultaneously insertion of the heating element through the cable pipe 7 by virtue of pressure from the hose 9. The melted material of the insulation washers will be lubricated on the inner wall of the coaxial pipe and serve as a suitable sliding coating for the subsequent withdrawal of the center conductor and possibly for the later insertion of new conductors as the distributed polyethylene will cover possible surface reliefs in the coaxial cable pipe. By heating of the heating element to 400° C., the polyethylene will have a low viscosity and simplify the method.

FIGS. 7 and 8 show cutting mills 10 and 11 for insertion into the cable pipe. For a coaxial cable a cutting mill 10 with cutter 17 bedded around the center conductor 5 is guided into the cable 1 by means of a hose 12 which also transmits the rotation movement of the cutting mill. The insulation washers are hereby cut into particles which may be removed by blowing air through the cable after the center conductor is withdrawn. In a telecommuncation cable 2, FIG. 8, a cutting mill 11 with cutter 18 and a sliding guidance 16, sliding with clearance against the internal wall of the outer mantle, is inserted. The sliding guidance 16 ensures that the cutting mill does not cut into the outer mantle and that all conductors 6 of the cable are guided toward the cutters 18. The cutting mill is forced through the cable by a hollow pressure hose 13 simultaneously acting to transmit the rotating motion of the cutter. Pressurized air is at the same time supplied into the pressure hose and penetrates through apertures 14 to the outside of the hose. The apertures 14 are provided close to the cutting mill and the cut particles will be blown out of the cable pipe 7.

FIG. 9 discloses the method by connection to the first end of a coaxial cable 1 of a pulsating pump introducing a liquid into the coaxial cable with a superimposed oscillation. At the same time tension is exerted onto the center conductor at the other end of the cable. As the liquid will penetrate through the spilt 15 in the insulation washers 3, a pressure will be exerted on all the washers over the entire length of the cable and force these simultaneously with the action of the tension on the center conductor, out of the other end of the cable.

By a further embodiment of the method electromagnetic oscillating pressure at one of the critical frequencies for the insulation material 3 is imposed on a coaxial cable 2, the substantial part of the insulation material 3 thereby being disintegrated, whereby the center conductor 5 may be unobstructedly withdrawn from the coaxial cable pipe 7.

I claim:

1. A method for converting external casings of existing cables comprising a conductor or a plurality of conductors surrounded by internal insulation material into hollow guiding tracks, which method comprises transforming the internal insulation material over a suitable length of the cable into a form wherein the insulation material occupies less volume between the casing and the conductor or conductors, so as to permit removal of the conductor or conductors from the casing, and thereafter removing the conductor or conductors from the cable.

2. A method according to claim 1, wherein the internal insulation material is transformed by means of a chemical solvent, which dissolves or breaks down the insulation material.

3. A method according to claim 1, wherein the internal insulation material of the cable is transformed by means of an oxidizing agent.

4. A method according to claim 3, wherein said oxidizing agent is oxygen.

5. A method according to claim 1, wherein said cable is a coaxial cable comprising a center core conductor and a cable mantle, and said insulation material is melted by heating the insulation material.

6. A method according to claim 5, wherein the insulation material is melted to form a substantially continuous coating on an internal surface of said casing by applying heat to the insulation material by means of the center core conductor.

7. A method according to claim 5, wherein heat is supplied to the insulation material by means of a heating element guided on the center core conductor, the element being energized by the center core conductor.

8. A method according to claim 5, wherein heat is supplied to the insulation material by means of a heating element guided on the center core conductor, the element being energized by the cable mantle.

9. A method according to claim 5, wherein heat is supplied to the insulation material by means of a heating element guided on the center core conductor of the coaxial cable, a pushing hose being provided around the center core conductor, which hose forces the element through the length of the cable mantle.

10. A method according to claim 5, wherein electrical power potential is applied to remote places of the center core conductor or the cable mantle, the insulation material thereby melting as result of heat generated by electrical resistance.

11. A method according to claim 1, wherein said cable is a telecommunication cable and said insulation material is transformed by application of electrical power potential to remote positions of the conductors, the insulation material thereby being carbonized, the volume of the insulation material and friction between the conductors and the external casing thereby being reduced, permitting withdrawal of the conductors.

* * * * *